Patented Mar. 24, 1942

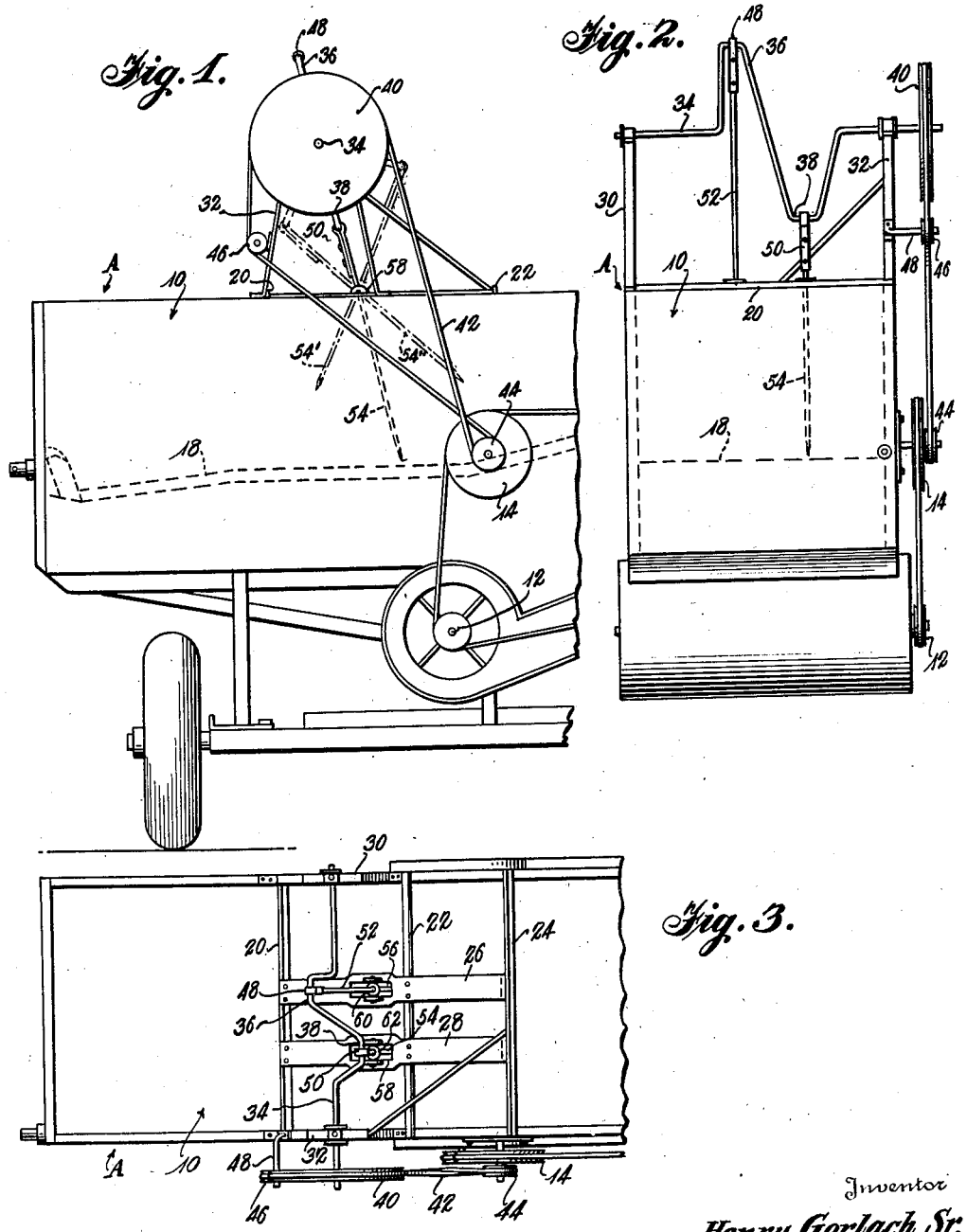

2,277,546

UNITED STATES PATENT OFFICE 2,277,546

STRAW AGITATOR

Henry Gerlach, Sr., Evansville, Ind.

Application September 19, 1940, Serial No. 357,479

2 Claims. (Cl. 130—22)

This invention relates to improvements in grain separators or devices known as combines and may take the form of an attachment which may be added to any existing separator or combine or the device of the invention may be embodied in the machine during its initial manufacture.

The general object of the invention is to provide a device for agitating straw to prevent piling up of the same and which also functions to separate seeds from the straw during agitation thereof.

Another object of the invention is to provide a device which will adapt the ordinary grain separator or combine for operation upon heavy materials such as soybeans.

Another object is to provide a straw agitator which is extremely simple in construction and durable in operation.

Other objects and advantages of the invention will be apparent from the following detailed explanation taken in conjunction with the accompanying drawing wherein a preferred embodiment of the invention has been selected for exemplification.

In the drawing:

Fig. 1 is an end elevational view of an agitating device constructed according to my invention as attached to a combine, the latter being shown in fragment;

Fig. 2 is a side view of the device of Fig. 1; and

Fig. 3 is a plan view of the device of Fig. 1.

Referring more particularly to the drawing wherein like numerals refer to like parts, the letter A represents in its entirety a combine of popular make and in common use having a housing 10 and provided with the conventional pulley 12 ordinarily used for driving a fan, and an idler pulley 14 supported thereabove. The pulleys 12 and 14 are arranged to be rotated by an endless belt driven from a pulley connected to the power take-off of the tractor, it being understood that the same belt may pass over other pulleys for driving the usual straw racks, return auger and the like.

The particular form of the combine or separator herein illustrated forms no part of the present invention and the representation of the combine is made merely for the purpose of illustrating the arrangement and operation of the particular improvements contemplated by the invention as hereinafter described. Similarly, the cutting and threshing mechanism form no part of the invention and hence are not illustrated, nor is the invention concerned with the particular construction of the usual cylinder provided at the left hand end of the combine as viewed in Fig. 1 for delivering threshed straw and grain material onto the straw rack indicated in dotted lines at 18 and positioned within the combine housing 10.

Coming now to the improvements contemplated by the invention, a support or platform composed of any convenient number of cross bars 20, 22 and 24 may be provided to extend across the width of the housing 10 to be bolted or otherwise secured thereto in a position above the straw rack 18 and rearwardly of the cylinder delivering material thereto. In some combines braces in the form of angle irons are provided as standard equipment at this point and in this event certain or all of the cross bars 20, 22 and 24 may be eliminated. A pair of shoes 26 and 28 are secured to the members 20, 22 and 24 to extend transversely of the same intermediate their ends and at each end thereof is an inverted U-shaped upright 30 and 32.

Rotatably supported upon the uprights 30 and 32 is a crank 34 having offset portions 36 and 38 and a pulley 40 is keyed to an end of the crank 34 projecting outwardly beyond the upright 32. A belt 42 is trained over the pulley 40 to drive the same from a smaller pulley 44 which may be keyed to the shaft supporting the conventional idler pulley 14. It is sometimes desirable to provide a small idler pulley 46 which may be conveniently supported by shaft 48 secured to and extending outwardly from the upright 32.

U-shaped straps 48 and 50 encircle the horizontal portions of offsets 36 and 38 of crank 34 and serve as hangers for rods 52 and 54, respectively, which are adjustably secured to the straps by bolts or the like. The rods or fingers 42 and 44 may be conveniently formed of solid steel about three-quarters of an inch in diameter and are supported by the crank 34 to project partially inside the housing 10 so that they may be alternately reciprocated into and out of the housing by the crank.

The rods or fingers 52 and 54 project through slots 56 and 58 provided in the shoes 26 and 28, respectively, and guide means for the rods in the form of collars 60 and 62 through which the rods are inserted are pivotally supported over the slots 56 and 58 by bolts or the like secured to upstanding lugs at opposite sides of the slots.

It will be seen that the agitating device of my invention is designed to be supported in position to operate upon the straw promptly after it is delivered to the straw rack 18 within the housing 10 of the separator or combine. The operation of the rods 52 and 54 as they are driven by the crank 34 and positioned by the guides 60 and 62 is such that the rods may be described generally as simulating a fork action. The rods are alternately projected downwardly into the body of the straw as indicated by the dotted line position 54′ of Fig. 1 and after each rod has completed its downward stroke it then moves forwardly in an arc about its guide as an axis agitating and carrying a portion of the straw with it and finally when its forward movement is completed each rod is withdrawn from the straw as indicated by the dotted line position 54″ in Fig. 1. The rods may be said to describe a substantially sector-shaped area inside the housing over the straw rack. The cycle is of course repeated alternately by each of the rods 52 and 54, the fork-like motion of the rods effectively agitating the straw to prevent piling up of the same and also shaking out some of the grain or seeds. Preferably the arc described by the end of the rods is about 30 to 40° and in a successfully used embodiment of the invention the projected ends of the rods are arranged to move a lateral distance of about twenty-four inches to a point adjacent the fishback rake receiving material from the straw rake.

I have found that two rods operating alternately relieves strain on the supporting structure and produces satisfactory results. It is understood, however, that my invention contemplates the use of a greater number of rods or even a single rod if such is found desirable for certain operations.

It will be observed in the construction illustrated that the collars or guides 60 and 62 are offset from the crank 34 in order to impart the desired forking action to the rods. The slots 56 and 58 are elongated and the collar members 60 and 62 are arranged to be adjustably positioned along the length of the slots whereby to regulate and selectively vary the pitch and arc described by the rods. Thus, for example, it is often desirable to adjust the pitch and arc of the rods according to whether a heavy or a light harvest product is being operated upon.

While I have described the preferred embodiments of my invention, it is understood that the invention is not to be limited except by the scope of the following claims.

What I claim is:

1. An attachment for agitating straw in a combine or grain separator comprising a support adapted to be mounted upon and project above the separator over the straw rack thereof, a crankshaft journalled upon said support, an elongated member rotatably mounted upon the crank of said shaft for reciprocal movement into and out of the body of straw on said straw rack, a guide collar pivotally secured to said support below said crankshaft and receiving said elongated member to permit reciprocal and oscillatory movement of the same, said crankshaft adapted to be rotated to cyclically drive the elongated member while received in said guide collar through at least a portion of the body of straw on said straw rack.

2. An attachment for agitating straw in a combine or grain separator comprising a support adapted to be mounted upon and project above the separator over the straw rack thereof, a crankshaft journalled upon said support, an elongated member rotatably mounted upon the crank of said shaft for reciprocal movement into and out of the body of straw on said straw rack, a guide collar pivotally secured to said support below said crankshaft and receiving said elongated member to permit reciprocal and oscillatory movement of the same, said guide collar being adjustable relative to said crankshaft to selectively vary the stroke of said elongated member and the said crankshaft adapted to be rotated to cyclically drive the elongated member while received in said guide column through at least a portion of the body of straw on said straw rack.

HENRY GERLACH, Sr.